US011980308B2

(12) United States Patent
Taylor

(10) Patent No.: US 11,980,308 B2
(45) Date of Patent: May 14, 2024

(54) HANGER AND HANGER ARRANGEMENT

(71) Applicant: The Janger Limited, London (GB)

(72) Inventor: Guy Taylor, London (GB)

(73) Assignee: The Janger Limited, London (GB)

( * ) Notice: Subject to any disclaimer, the term of this patent is extended or adjusted under 35 U.S.C. 154(b) by 463 days.

(21) Appl. No.: 17/282,628

(22) PCT Filed: Oct. 10, 2019

(86) PCT No.: PCT/GB2019/052883
§ 371 (c)(1),
(2) Date: Apr. 2, 2021

(87) PCT Pub. No.: WO2020/074907
PCT Pub. Date: Apr. 16, 2020

(65) Prior Publication Data

US 2021/0337994 A1 Nov. 4, 2021

(30) Foreign Application Priority Data

Oct. 11, 2018 (GB) .................................... 1816565

(51) Int. Cl.
*A47G 25/14* (2006.01)
*G09F 3/04* (2006.01)

(52) U.S. Cl.
CPC ........... *A47G 25/1421* (2013.01); *G09F 3/04* (2013.01)

(58) Field of Classification Search
CPC ................ A47G 25/1421; A47G 25/14; A47G 25/1407; A47G 25/1414; A47G 25/1428; A47G 25/1435; G09F 3/03; G09F 3/06
See application file for complete search history.

(56) References Cited

U.S. PATENT DOCUMENTS 1,348,952 A * 8/1920 Landry .............. A47G 25/1407 40/322
2,801,036 A * 7/1957 Klein ........................ G09F 3/18 D6/318
4,137,661 A * 2/1979 Johansson .......... A47G 25/1428 40/322
4,967,500 A * 11/1990 Bredeweg .......... A47G 25/1407 40/658
4,997,114 A 3/1991 Petrou
5,407,109 A 4/1995 Zuckerman
5,449,099 A * 9/1995 Blanchard .......... A47G 25/1435 40/322

(Continued)

FOREIGN PATENT DOCUMENTS

FR 2965156 3/2012

OTHER PUBLICATIONS

International Search Report and Written Opinion for corresponding International Patent Application No. PCT/GB2019/052883, dated Mar. 16, 2020.

*Primary Examiner* — Ismael Izaguirre
(74) *Attorney, Agent, or Firm* — Renner, Otto, Boisselle & Sklar, LLP

(57) ABSTRACT

A garment hanger assembly (10) comprising a garment hanger (12) and an information element (14). The information element (14) slidably engages an element-receiving channel (34) of the garment hanger and is retained therein. A tool (16) is provided to apply and/or remove an information element from the hanger.

5 Claims, 4 Drawing Sheets

(56) References Cited

U.S. PATENT DOCUMENTS

| | | | | | |
|---|---|---|---|---|---|
| 5,477,995 | A * | 12/1995 | Dooley | A47G 25/1435 | 206/459.1 |
| 6,029,868 | A * | 2/2000 | Willinger | A47G 25/1414 | 40/322 |
| 7,278,559 | B1 * | 10/2007 | Sutton | A47G 25/1435 | 223/85 |
| 8,113,394 | B2 * | 2/2012 | Ho | G09F 3/20 | 40/322 |
| 2006/0049222 | A1 | 3/2006 | Pluchino et al. | | |
| 2007/0158373 | A1 | 7/2007 | Yau | | |
| 2009/0294494 | A1 | 12/2009 | Ho | | |

* cited by examiner

HANGER AND HANGER ARRANGEMENT

This application is a national phase of International Application No. PCT/GB2019/052883, filed on Oct. 10, 2019, which claims priority to GB Application No. 1816565.4, filed on Oct. 11, 2018, all of which are hereby incorporated by reference.

FIELD OF THE INVENTION

The invention relates to garment hangers, information elements therefor, particularly sizers, and arrangements including garment hangers with sizers connectable or connected thereto.

BACKGROUND TO THE INVENTION

It is desirable to present information about garment on the hanger upon which they are hung to allow a customer to readily identify a product and its size in order to choose the correct item for them. As a garment hanger may be employed to hang different garments, it is desirable that such information is able to be removed and replaced. The information most often required is the size of the garment, but it may be other information, such as the brand name.

Sizers are regularly employed on garment hangers and the most common occurring is a collar that fits around the hook of a garment hanger and can be fed over the end of the hook to apply it. The collar sits on the garment hanger and is retained thereon, often due to gravity; however, if the hanger is turned upside-down, the sizer collar may slide off the hook.

Other sizers may be used that clip onto the hanger, for example, by push-fitting onto the hanger, such as set out in U.S. Pat. No. 5,407,109 (Zuckerman) and US2007/0158373 (Yau). Whilst there are less likely to disengage, they are often difficult to fit and remove and require a good deal of force to get them on and off.

SUMMARY OF THE INVENTION

Accordingly, the present invention is directed to a garment hanger comprising an element-receiving channel, wherein the element-receiving channel has a length and a width, and the hanger is adapted to slidably receive an information element into the element-receiving channel.

Employing a channel to slidably receive an element, for example a sizer, provides a convenient location to easily slide a sizer onto the hanger that avoids having to thread the element onto the hook of a hanger or force the sizer over ridges. Additionally, it can be located to avoid any interference with the internal edge of the support engaging portion, which is normally a hook. Additionally, it can be readily accessed and easily applied and removed.

Preferably, the information element is received from a direction that is not perpendicular to its length, and, more preferably, the direction is substantially parallel with the length of the element-receiving channel. The use of an element-receiving channel simplifies the engagement and disengagement of the information element by requiring movement of the respective parts in a single linear direction that is non-perpendicular to the length of the channel.

It is advantageous that the element receiving channel is arranged with the length being greater than the width and, preferably, the element receiving channel is substantially linear. This allows the information element to be easily received onto the hanger by sliding it in a substantially linear manner. It will be appreciated that the information element may have a substantially linear engaging section on its internal surface so as to engage with the substantially linear element-receiving channel. Thus, the information element may be of any shape, but the engaging surface of the information element is substantially linear.

It is preferable that at least one end of the channel is arranged adjacent an edge of the hanger. Having the channel positioned adjacent the edge of the hanger, preferably a curved edge, allows the end of the channel to be substantially open to allow the information element to be readily positioned and slid onto, and from, the garment hanger. The open end of the channel makes the application and removal easier, particularly if the axial length of the channel is adjacent an edge of the hanger.

In one arrangement, wherein the channel comprises an opening and/or a substantially lateral lip at, or adjacent, one end. This reduces the risk of inadvertent disengagement of the element because the element can be positioned within the channel and the lip can abut an end of the element and provide some resistance to disengagement. The lip may be less deep than the walls of the channel, which allows the sizer to readily pass thereover, but also provides some resistance to disengagement.

Advantageously, the element-engaging channel is located on a hook portion or a body portion of the garment hanger, which provides an easily visible location for customers to see the information.

It is preferable that at least a portion of the hook and/or body portion of the hanger is substantially planar, and the element-receiving channel is located on that planar portion. Where there is a planar or flat section, it is easier to apply and remove the element to/from the hanger. The whole hanger may comprise a planar material or just part of the hanger may be made of the planar material.

The invention extends to a garment hanger arrangement comprising:

a garment hanger as described herein; and an information element;

wherein the information element slidably engages the element-receiving channel of the garment hanger and is retained therein.

The arrangement of a garment hanger and slidable information element engaging the garment hanger provides a readily replaceable information element that can be reliably retained on the hanger and quickly changed, when needed.

It is preferable that the information element comprises a substantially U-shaped recess that, in use, engages the garment hanger and, more preferably, the information element has protrusions or teeth that abut the walls of the element-receiving channel when engaged on the garment hanger. This allows the element to wrap around the hanger and to grip onto the hanger, within the element-receiving channel with the internal surface of the U-shaped information element being adjacent an edge of the hanger. The internal recess of the information element is provided with a U-shape such that it can wrap around the hanger and sit adjacent the front and back of the element-receiving channel, whilst engaging the edge of the hanger.

Advantageously, the garment hanger and the information element are made from polypropylene. Employing the same material for both parts allows the combination to be readily recycled without having to disengage the parts beforehand.

The invention further extends to a garment hanger element applicator/removal tool comprising:

an elongate element-receiving recess therein; and a hanger-receiving channel that intersects the element-receiving recess and passes therethrough.

The tool allows the application and removal of the information element to be more easily achieved.

In one arrangement, the hanger-receiving channel is open at both ends. Having the hanger-receiving channel open at both ends allows a hanger to be threaded into the channel from either direction and it may also be possible to slide the hanger through the length of the hanger-receiving channel, thereby making it simple for a user to quickly remove the element from the hanger or apply one thereto.

It is preferable that at least one lip is provided within or adjacent the recess and protruding into or over the recess. The lip can be employed to grip the element to be removed, thereby making process easier for the user and reducing the forces required for removal of elements from hangers.

Advantageously, there is provided a base section with securing mechanism or handle. Having a base section with a securing mechanism, which may be in the form or an aperture, allows the tool to be fixed to a surface or for a lanyard or other element to be connected to the tool. Other securing mechanisms may include locking protrusions or locking recesses that fit to corresponding parts and/or a hook section. Similarly, a handle allows the user to more easily grip and operate the tool.

BRIEF DESCRIPTION OF THE DRAWINGS

An embodiment of the invention will now be described, by way of example only, and with reference to the accompanying drawings, in which.

DETAILED DESCRIPTION OF EXEMPLARY EMBODIMENTS

Figure 1:
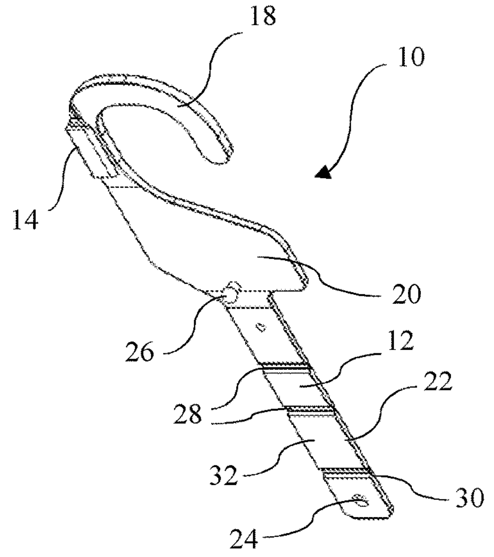
FIG. 1 shows a garment hanger with a slidable sizer fitted thereto in accordance with the present invention.

FIGS. 1 to 9 show a garment hanger arrangement 10 comprising a garment hanger 12, an information element in the form of a sizer 14 that is slidably engageable with, or connectable to, the garment hanger 12 and a tool 16 for applying and/or removing the sizer 14 from the garment hanger 12.

The garment hanger 12 comprises a support-engaging portion in the form of a hook 18, a body 20 and a deformable elongate member 22, the elongate member 22 comprising a first part of a connection mechanism 24 and the hanger having a second part of a connection mechanism 26 positioned away from the first part of the connection mechanism 24, such that the elongate member 22 can be deformed back upon itself and connected to the hanger 12 to form a loop. The end of the elongate member 22 distal from the support-engaging portion 18 is narrower than the span of the support engaging portion 18.

In the embodiment of FIGS. 1 to 9, although it is optional, and the elongate member 22 comprises two pre-determined weakened regions 28 and may include a third predetermined weakened region 30. The predetermined weakened regions 28 allow the elongate member 22, when it is in its deformed state to form a triangular loop that may have a substantially flat spacer 32 at the intended lower end of the triangular loop so that an item rests upon the substantially flat spacer 32 when in use.

Figure 1A:
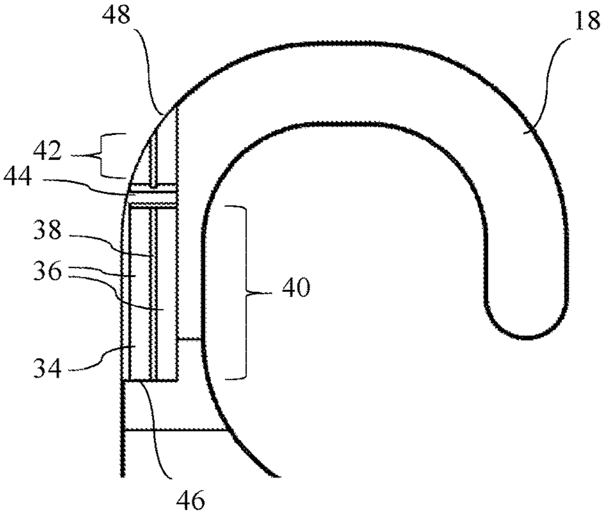
Figure 1B:
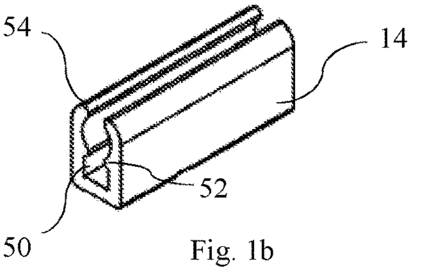
Figure 2:
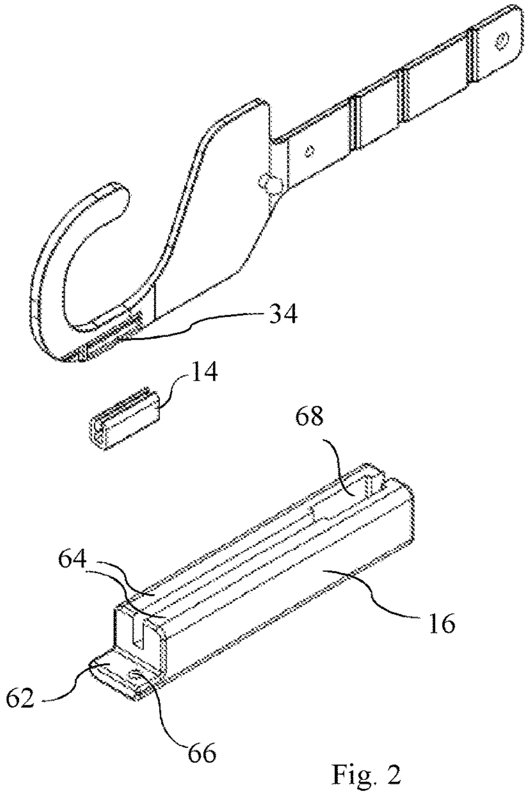
FIGS. 2 to 9 show various views of the arrangement of FIG. 1 and a tool therefor.
Figure 3:
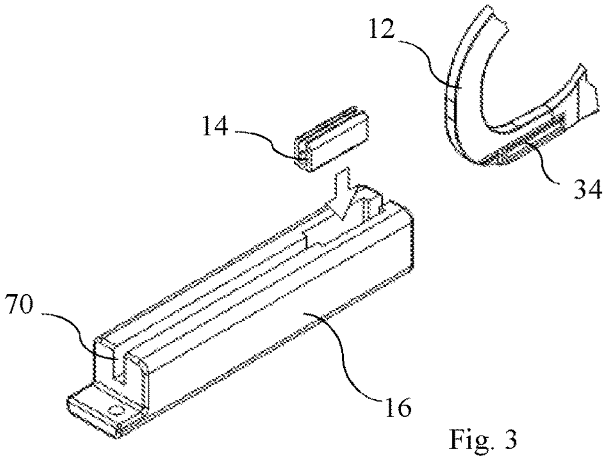
Figure 4:
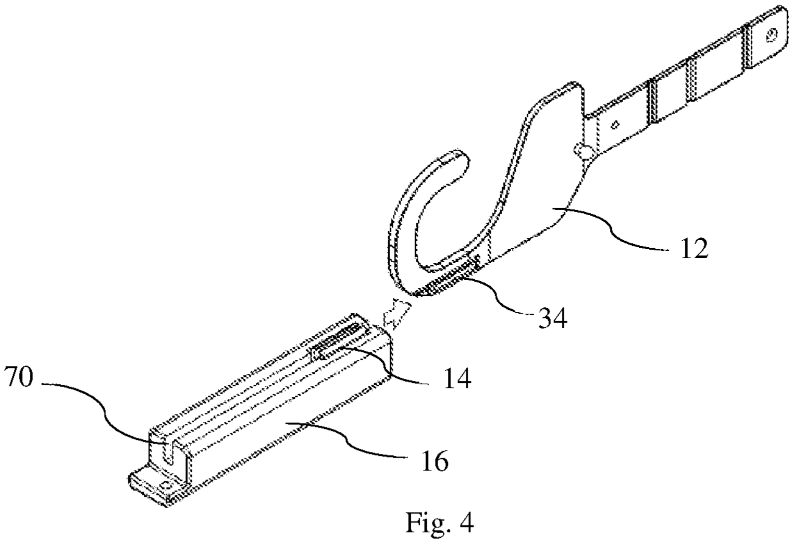
Figure 5:
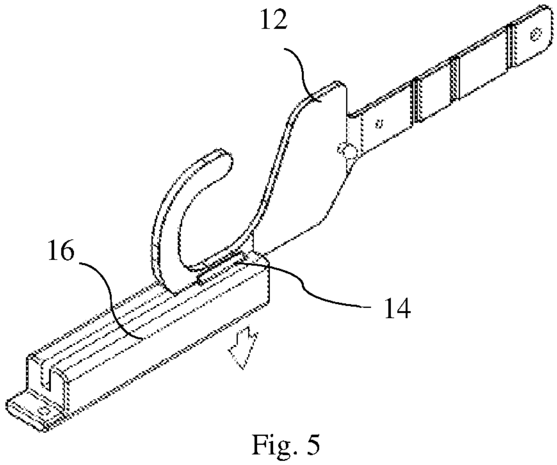
Figure 6:
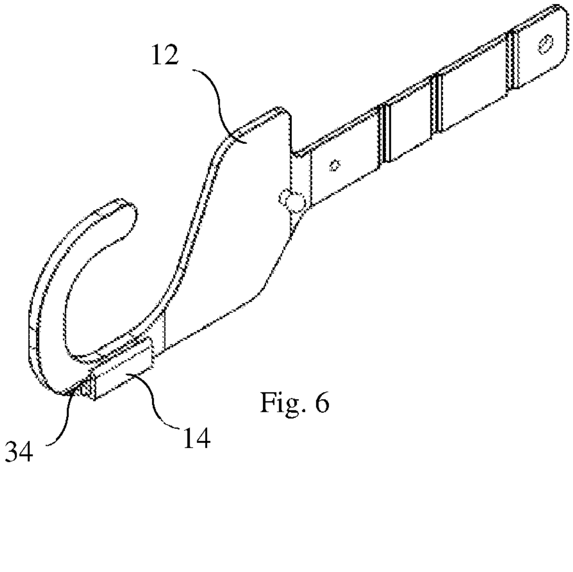
Figure 7:
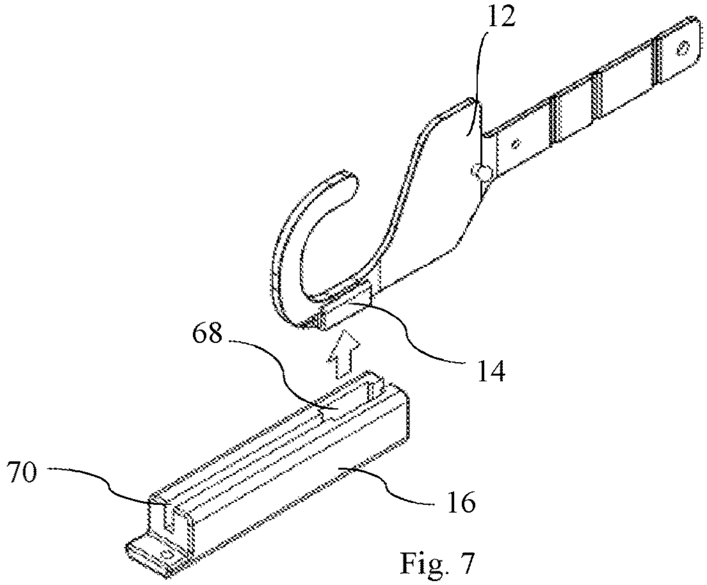
Figure 8:
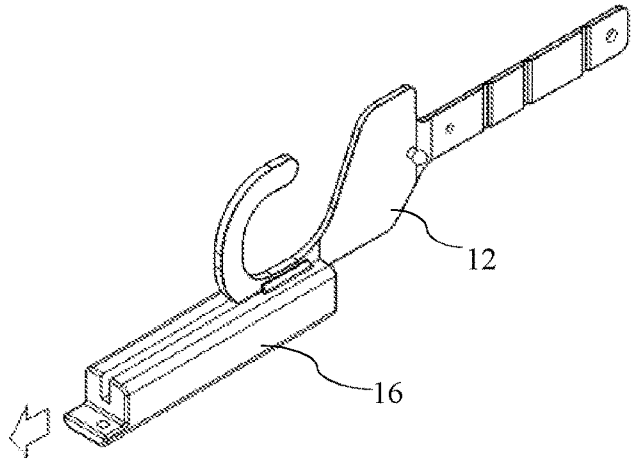
Figure 9:
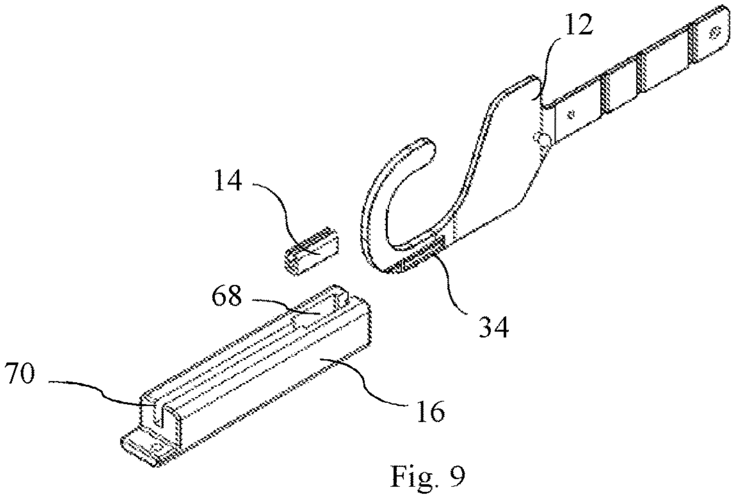

The hook 18 is provided with a channel 34, which is shown more clearly in FIG. 1*a*. The channel 34 has a pair of parallel depressions 36 either side of a central ridge 38 and comprises a first section 40 and a second section 42, divided by a lateral ridge 44. The channel 34 is closed at one end 46 and open at the other end 48, so that a sizer element 14 can slidably engage the channel 34 through the open end 48 and abut the closed end 46. Whilst the channel 34 may be provided on just one side of the hanger, it is provided on both sides of the hanger 12 in the embodiment shown in the Figures.

The sizer 14 is cuboid shaped, although other shapes may be employed, and has a recess 50 with an internal U-shaped profile along one edge. The U-shaped recess 50 has a first pair of inwardly projecting protrusions 52 along its internal surface and a second pair of inwardly projecting protrusions 54 adjacent the open end of the U-shaped recess 50. The sizer 14 comprises a resiliently yieldable material to allow it to elastically deform.

A tool 16 is provided to applying and/or removing the sizer 14 from the hanger 12. The tool 16 comprises a base section 62 that is provided with walls 64 extending therefrom and the base further comprises an extension 64 with an aperture 66 therein. The aperture 66 may be used to fix the tool 16 to a surface to for attaching a lanyard, string, chain or other retaining means to the tool.

Within the walls 64 is a rectangular recess 68 that is sized and shaped to receive the sizer 14. The recess 68 is intersected by a hanger-receiving channel 70 that extends parallel with the longitudinal axis of the recess 68 and passes therethrough, subsequently extending the length of the walls so that the channel 70 is open at both ends, although it will be appreciated that, in some arrangements, it could be closed at one or both ends.

To apply the sizer 14 to the hanger, the sizer 14 is placed within the recess 68 of the tool 16, so that it rests on the intended bottom surface of the recess 68. The tool 16 is then slipped over the hook 18 of the garment hanger 12 and the hanger passes through the hanger receiving channel 70. The arrow on the figures denotes the direction of movement of the tool 16, relative to the hanger 12. As the hanger 12 passes through the hanger-receiving channel 70, the sizer 14 slidably engages with the sizer-receiving channel 34, with the inward protrusions 52 and 54 being received within the respective depressions 36. Thus, the U-shaped recess 50 of the sizer 14 wraps around the hanger 12. The sizer 14 slides into the sizer-receiving channel 34 until it passes over the lateral ridge 44, which retains it thereupon. The sizer 14 is wrapped around the hanger with the U-shaped recess adjacent the front, back and edge of the hanger 12.

To remove the sizer 14 from the hanger 12, the reverse steps are undertaken and tool 16 is placed over the sizer 14 and slides away from the elongate section of the hanger 12 to remove the sizer 14 from the hanger 12. The sizer 14 is retained in the recess 68 after removal to avoid it being inadvertently lost. To remove the sizer 14 from the tool 16, the tool 16 is rotated so that the sizer 14 can fall out of the recess 68.

Figure 10:
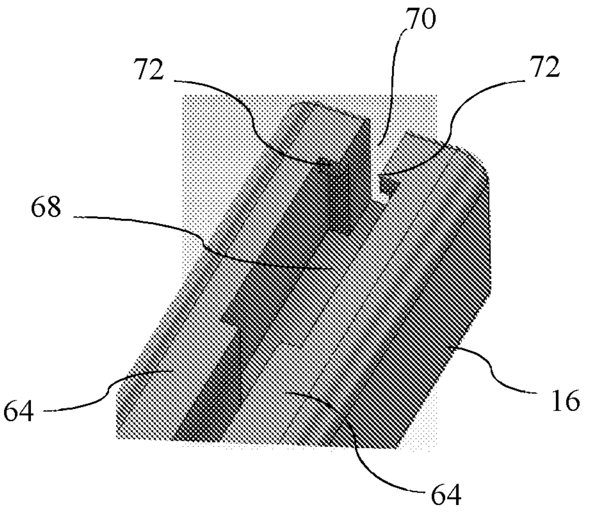
FIG. 10 shows an applicator/removal tool in accordance with the present invention.

FIG. 10 shows a tool that is provided with at least one, and preferable two, lips, teeth or flanges 72 provided on the upper surface of the tool 16 that protrude into, or above, the recess 68. The lips or flanges 72 on the top edge of the recess, or adjacent the recess and extending thereover, of the tool 16 may be provided at both ends of the recess 68 to allow the tool 16 to remove information elements, such as sizers, from either direction.

The tool 16 may be used to remove similar shaped sizers that clip onto garment hangers, rather than slide thereon. To apply the sizer, it is placed into the recess 68 of the tool 16 and the hanger is placed within the channel 70 and pushed further into the tool 16, which parts the protrusions of the sizer to allow the hanger to engage the recess in the sizer. Similarly, the remove the sizer, the hanger and attached sizer are placed in the tool 16 and positioned so that sizer 14 is positioned within the region between the lip 72 and the base of the recess 68. The lip 72 grips the sizer and the hanger 12 can be pulled out of the recess 68, the forces on the sizer 14 parting the protrusions and allowing the sizer 14 to disengage from the hanger 12. Such an arrangement does not slide the sizer from the hanger, but rather pulls, or forces, it therefrom. A rotational movement of the hanger may be desirable to aid with the removal of the sizer.

Figure 11:
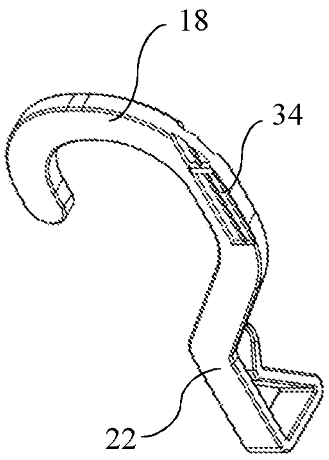
FIG. 11 shows a further garment hanger in accordance with the present invention.

FIG. 11 shows an arrangement in which the body of the hanger is omitted, with the hook 18 and the elongate portion 22 being connected directly. The sizer-receiving channel 34 is positioned on the hook 18, but it could be at a position along the elongate member 22. The hanger in FIG. 11 is provided with a fixed shape and the elongate portion is substantially rigid, rather than being flexible, thereby creating a substantially fixed triangular section with an opening in the intended top of the loop, above the flat spacer section.

It is envisaged that the channel on the garment hanger may be arcuate and the information element substantially flexible in order to conform to the shape of the channel.

The invention claimed is:

1. A garment hanger comprising:

an information element having a length and a width and a U-shaped internal recess extending along an entirety of the length of the information element;

a substantially linear element-receiving channel, wherein the element-receiving channel has a length and a width, with the length of the element-receiving channel being greater than the width of the element-receiving channel, wherein the element-receiving channel is adapted to slidably receive the information element;

wherein the information element is receivable onto the element-receiving channel by means of the U-shaped internal recess, so that the region distal to the opening of the U-shaped internal recess of the information element is parallel to the length of the channel as it is received into the channel, and wherein the channel is arranged in the hanger to slidably receive the information element from a direction non-perpendicular to its length, wherein the element-receiving channel is closed at a first end and open at a second end and comprises a lateral ridge at the second end, so that the information element can slidably engage the element-receiving channel through the second, open end, slide into the channel until the information element passes over the lateral ridge, which then retains the information element within the channel, such that the information element abuts the closed, first end of the element-receiving channel.

2. A garment hanger arrangement according to claim 1, wherein the information element has protrusions or teeth that abut the walls of the element-receiving channel when engaged on the garment hanger.

3. A garment hanger arrangement according to claim 1, wherein the garment hanger and the element are made from polypropylene.

4. A garment hanger arrangement according to claim 1, wherein the open end of the element-receiving channel comprises an opening that extends substantially across the width of the channel.

5. A garment hanger for use in the arrangement of claim 1, wherein at least one end of the channel is arranged adjacent the edge of the hanger.

* * * * *